UNITED STATES PATENT OFFICE.

HERMANN LORCH, OF MILWAUKEE, WISCONSIN.

FOOD PRODUCT.

SPECIFICATION forming part of Letters Patent No. 318,764, dated May 26, 1885.

Application filed April 17, 1885. (No specimens.)

*To all whom it may concern:*

Be it known that I, HERMANN LORCH, of Milwaukee, in the county of Milwaukee, and in the State of Wisconsin, have invented certain new and useful Improvements in Food Products; and I do hereby declare that the following is a full, clear, and exact description thereof.

My invention relates to food products; and it consists in an article for use in preparing soups, &c., made from a species of grain known as "spelt" or *Triticum spelta*, as will be more fully set forth hereinafter.

The manner of preparing my food product is set forth in my application filed November 19, 1884, Serial No. 148,336, and consists in cutting the grain while it is still green, and about two weeks before it is ripe, and separating the ears from the stalks, placing the ears in a suitable apparatus for drying, and smoking them with the smoke of green wood, and keeping them there until the kernels are thoroughly dry and hard, after which the said kernels are thrashed out, subjected for two days to a heat of about 84° to 88° Fahrenheit in a suitable chamber, then cracked or coarsely ground, and put in tight cases, and subjected to the vapors given off by heated pepper, nutmeg, and juniper-berries (for ten hours each successively) and then hermetically sealed up in proper cans, all as set forth at length and specifically in my said application above referred to.

My food product thus prepared may be used in a variety of ways, and makes a delicious soup, being used after the manner of barley or rice soup, and requiring no spicing or flavoring. The product, when sealed up in the cans, will keep any length of time desired, and preserve its flavors to the last, being always ready for use.

If desired, my food product might be impregnated with the flavors of other spices than those specifically named; but I prefer those particular spices in ordinary cases.

Having thus described my invention, what I claim as new, and desire to secure by Letters Patent, is—

1. As a food product, smoke-dried unripe spelt in a cracked or coarsely-ground condition.

2. The herein-described food product, consisting of smoke-dried unripe spelt in a cracked or coarsely-ground condition and impregnated with the flavors of pepper, nutmeg, and juniper-berries.

In testimony that I claim the foregoing I have hereunto set my hand, at San Antonio, in the county of Bexar and State of Texas, in presence of two witnesses.

HERMANN LORCH.

Witnesses:
ANTONIO R. PEREZ,
P. H. MARX.